United States Patent
Huang et al.

(10) Patent No.: US 10,240,074 B2
(45) Date of Patent: Mar. 26, 2019

(54) DEGRADABLE AND RECYCLABLE EPOXY CONDUCTIVE ADHESIVE AS WELL AS PREPARING, DEGRADING AND RECYCLING METHODS THEREFOR

(71) Applicant: SHENGYI TECHNOLOGY CO., LTD., Guangdong (CN)

(72) Inventors: Zengbiao Huang, Guangdong (CN); Huayang Deng, Guangdong (CN); Yongjing Xu, Guangdong (CN)

(73) Assignee: SHENGYI TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/537,519

(22) PCT Filed: May 27, 2015

(86) PCT No.: PCT/CN2015/079981
§ 371 (c)(1),
(2) Date: Jun. 19, 2017

(87) PCT Pub. No.: WO2016/095436
PCT Pub. Date: Jun. 23, 2016

(65) Prior Publication Data
US 2017/0342301 A1    Nov. 30, 2017

(30) Foreign Application Priority Data

Dec. 19, 2014 (CN) .......................... 2014 1 0809870

(51) Int. Cl.
| | |
|---|---|
| C09J 163/00 | (2006.01) |
| C08G 59/40 | (2006.01) |
| C08K 9/00 | (2006.01) |
| C08G 59/50 | (2006.01) |
| C09J 9/02 | (2006.01) |
| C09J 11/04 | (2006.01) |
| C09J 11/06 | (2006.01) |
| C08G 59/22 | (2006.01) |
| C08G 59/66 | (2006.01) |
| C01B 13/00 | (2006.01) |

(52) U.S. Cl.
CPC .......... *C09J 163/00* (2013.01); *C08G 59/223* (2013.01); *C08G 59/504* (2013.01); *C09J 9/02* (2013.01); *C09J 11/04* (2013.01); *C09J 11/06* (2013.01); *C01B 13/00* (2013.01)

(58) Field of Classification Search
CPC ........ C09J 163/00; C08L 63/00; C08G 59/40; C08G 59/50; C08G 59/66; C08K 3/042; C08K 3/08; C08K 9/00
USPC ......... 156/330; 523/427, 428, 440, 457, 458
See application file for complete search history.

(56) References Cited

U.S. PATENT DOCUMENTS

| | | | |
|---|---|---|---|
| 6,548,175 B2 | 4/2003 | Sachdev et al. | |
| 9,631,049 B2* | 4/2017 | Pastine | C07D 295/13 |
| 9,862,797 B2* | 1/2018 | Pastine | C08G 59/1477 |
| 2002/0171132 A1* | 11/2002 | Buchwalter | C08G 59/24 257/678 |
| 2008/0152921 A1 | 6/2008 | Kropp | |
| 2013/0245204 A1* | 9/2013 | Pastine | C07D 295/13 525/409 |
| 2016/0264717 A1* | 9/2016 | Pastine | C07C 217/08 |

FOREIGN PATENT DOCUMENTS

| | | | | |
|---|---|---|---|---|
| CN | 101935510 A | | 1/2011 | |
| CN | 102010685 A | * | 4/2011 | .............. C09J 11/04 |
| CN | 102153976 A | | 8/2011 | |
| CN | 103194164 A | | 7/2013 | |
| CN | 103483554 A | | 1/2014 | |
| CN | 103524784 A | | 1/2014 | |
| GB | 2407578 A | * | 5/2005 | .............. H01B 1/22 |
| JP | 2001002892 A | * | 1/2001 | .............. C08L 63/00 |
| WO | WO-2012071896 A1 | * | 6/2012 | ........... C07D 295/13 |
| WO | WO-2015054698 A1 | * | 4/2015 | .............. C07C 17/08 |

OTHER PUBLICATIONS

Machine translation of JP-2001002892-A (no date).*
Machine translation of CN-102010685-A (no date).*
Machine translation of CN-103524784-A (no date).*
Patent Cooperation Treaty (PCT), International Search Report and Written Opinion for Application PCT/CN/2015/079981 filed May 27, 2015, mailed Sep. 25, 2015 International Searching Authority, CN.

* cited by examiner

*Primary Examiner* — Michael J Feely
(74) *Attorney, Agent, or Firm* — McDonald Hopkins LLC

(57) ABSTRACT

The present invention provides a degradable and recyclable epoxy conductive adhesive, which comprises the following raw materials in percentage by weight: 15% to 30% of epoxy resin, 1% to 10% of a curing agent, 0.1% to 2% of a reaction diluent and 15% to 85% of a conductive filler, wherein the curing agent comprises a breakable molecular structure. According to the epoxy conductive adhesive of the present invention, after the epoxy resin in the conductive adhesive is cured by using the recyclable and degradable epoxy resin curing agent of a specific molecular structure, the conductive adhesive can be degraded in normal pressure, mild and specific conditions, the process is simple and the operation is convenient, no contamination is brought to the environment, the recycling cost is largely reduced, and the recycling of the conductive adhesive has enormous economic and environmental advantages. By using the recyclable and degradable epoxy resin curing agent of a specific molecular structure, the shear strength of the conductive adhesive is greatly increased, and the reliability and the service life of the conductive adhesive are largely improved.

20 Claims, No Drawings

DEGRADABLE AND RECYCLABLE EPOXY CONDUCTIVE ADHESIVE AS WELL AS PREPARING, DEGRADING AND RECYCLING METHODS THEREFOR

CROSS-REFERENCE TO RELATED APPLICATION

This application is a 35 U.S.C. 371 national stage filing of PCT Application No. PCT/CN2015/079981, filed on May 27, 2015, which claims priority to Chinese Patent Application No. 201410809870.3, filed on Dec. 19, 2014 each of which are incorporated herein in their entirety by reference.

TECHNICAL FIELD

The present invention relates to semiconductor encapsulation, and particularly relates to a degradable epoxy conductive adhesive and processes for preparing, degrading and recovering the same.

BACKGROUND ART

Lead in tin-lead solders has been proved to be toxic. People worry that high-lead solder in tin-lead solders will be harmful to the environment and the human. EU is very active in legislation to prohibit the use of lead in the electronics industry. In June 2000, European Union issued two regulations of Waste Electrical and Electronic Equipment Directive (WEEE) and Restriction of Hazardous Substances (RoHS). In lead-free solders, 95.4Sn/3.1Ag/1.5Cu has been widely considered to be the most promising lead-free solder. However, such solder has a melting point of 217° C., which is higher than that of the lowest tin-lead solder (183° C.) by 30° C.

In order to make the lead-free solder obtain sufficient wetting during processing, the processing temperature needs to be 30-40° C. higher than the melting point during the electronic assembly process. The increase of the temperature reduces the integration, reliability and functionality of the printed circuit board, components and its accessory parts.

Conductive adhesive is mainly composed of organic polymer matrix and metal filler, wherein the conductive filler provides conductive property, and the polymer matrix provides physical and mechanical properties. As compared with metal solder, conductive adhesive has many advantages, such as environment-friendly (no lead and reflux cleaning agent), mild processing conditions, less processing steps (lowering processing costs), especially fine pitch connection capability formed by using small particles. Although conductive adhesives have many advantages, they are still in infancy as compared to mature tin-lead solders, and there are many shortcomings and challenges that need to be addressed, such as lower conductivity and thermal conductivity as compared to the materials connected with solder, conductive fatigue in reliability testing, limited current carrying capacity, metal migration fatigue and poor impact strength in high pressure and reliability testing.

The thermal conductivity of graphene is as high as 5300 W/m·K, which is higher than those of carbon nanotubes and diamonds. The electron mobility thereof at room temperature is more than 15000 $cm^2/V·s$, which is higher than that of carbon nanotubes or silicon crystals. The resistivity thereof is only about $10^{-6}$ $\Omega·cm$, which is lower than that of copper or silver and is the material having the world's smallest resistivity. Because of its very low resistivity, the electron migration thereof is extremely fast and it has special electronic properties. As compared with the expensive fullerene and carbon nanotubes, graphene is inexpensive and the raw materials are easy to obtain. Thus graphene is expected to be the high-quality filler of the polymer nanocomposites. At present, it has been studied as a modifier of precious metals such as metallic silver, so as to improve the electrical conductivity of the conductive adhesive after the addition.

The conventional conductive adhesive achieves a bonded conductive interconnect to the semiconductor by adding a large amount of precious metals such as metallic silver or graphene surface modified metallic silver to a resin matrix composed of an epoxy resin, a curing agent, an accelerator and adjuvant(s), and then by heating or light-curing. The current studies focus more on how to increase the amount of conductive filler or to modify the surface of the conductive filler so as to improve the electrical conductivity. But the study on the resin system of the conductive adhesive is very less, especially curing agent. Curing agent has great effect on the use characteristics of the conductive adhesive, and the performance of the thermosetting polymer formed by curing and having a three-dimensional network structure.

CN102010685A uses one or more curing agents selected from dicyandiamide, modified imidazole and its derivatives and modified amine curing agents. Said curing agents are used to cure bisphenol A epoxy resin or bisphenol F epoxy resin, and the resultant cured product forms a thermosetting polymer having a three-dimensional network structure. Such thermosetting polymer has the shortcomings, such as being difficult to melt, being difficult to dissolve in organic solvents, resulting in more processing steps, high cost and complex operations for recovering precious metals (e.g. flake silver powder, nano silver particles) and graphene in conductive adhesive. In addition, CN102010685A discloses using conventional dicyandiamide, or imidazole curing agents. Since these conventional curing agents have worse thermal resistance (dicyandiamide), or have too much rigidity (aromatic amines), insufficient shear strength, they are difficult to balance among heat resistance, toughness and rigidity. CN102925100A also discloses using conventional curing agents and also has the aforesaid problems.

DISCLOSURE OF THE INVENTION

In view of the shortcomings of the thermosetting polymers produced by curing epoxy resins with epoxy resin curing agents used for the current conductive adhesive, such as being difficult to melt, dissolve and recover, being of insufficient shear strength and the like, the object of the present invention is to provide a degradable and recoverable epoxy conductive adhesive, processes for preparing, degrading and recovering the same. The epoxy conductive adhesive of the present invention can be degraded under normal pressure, mild and specific conditions by curing the epoxy resin in the conductive adhesive with a recyclable and degradable epoxy resin curing agent having a specific molecular structure. The advantages of being simple, easy to operate, and environmental protection, and greatly reducing the recovery cost have great economic and environmental advantages for the recovery of the conductive adhesive. Moreover, the application of the recoverable and degradable epoxy resin curing agent having a specific molecular structure greatly increases the shear strength of the conductive adhesive, and notably improves the reliability and life time of the conductive adhesive.

In order to achieve the aforesaid object, the present invention discloses the following technical solutions.

A degradable and recoverable epoxy conductive adhesive comprises the following raw materials in weight percentage: 15-30% of an epoxy resin, 1-10% of a curing agent, 0.1-2% of a reactive diluent and 15-85% of a conductive filler, said curing agent comprising a breakable molecular structure shown as follows:

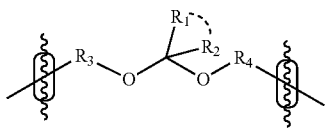

Formula (I)

wherein $R_1$ and $R_2$ are independently anyone selected from the group consisting of hydrogen atom, alkyl group, cycloalkyl group, heterocyclic group, heterocycloalkyl group, alkenyl group, cycloalkenyl group, aromatic group, heteroaromatic group, alkyl heteroalkyl group, alkynyl group, alkylene group, alkylene heteroalkylene, alkenylene group, alkylene heteroalkenylene, alkynylene group and alkylene heteroalkynylene; $R_1$ and $R_2$ may be the same, or different from each other;

$R_3$ and $R_4$ are independently anyone selected from the group consisting of alkylene group, alkylene heteroalkylene, alkenylene group, alkenylene heteroalkenylene, alkylene heteroalkenylene, alkynylene group, cycloalkylene group, alkylene cycloalkylene, alkylene cycloalkylene alkylene, alkenylene cycloalkylene, alkenylene cycloalkylene alkenylene, alkylene cycloalkylene alkenylene, alkynylene cycloalkylene, alkynylene cycloalkylene alkynylene, heterocycloalkylene group, alkylene heterocycloalkylene, alkylene heterocycloalkyl alkylene, alkenylene heterocycloalkylene, alkenylene heterocycloalkyl alkenylene, alkylene heterocycloalkyl alkenylene, alkynylene heterocycloalkylene, alkynylene heterocycloalkyl alkynylene, cycloalkenylene, alkylene cycloalkenylene, alkylene cycloalkenylene alkylene, alkenylene cycloalkenylene, alkenylene cycloalkenylene alkenylene, alkylene cycloalkenylene alkenylene, alkynylene cycloalkenylene, alkynylene cycloalkenylene alkynylene, heterocycloalkenylene, alkylene heterocycloalkenylene, alkylene heterocycloalkenyl alkylene, alkenylene heterocycloalkenylene, alkenylene heterocycloalkenyl alkenylene, alkylene heterocycloalkenyl alkenylene, alkynylene heterocycloalkenylene, alkynylene heterocycloalkenyl alkynylene, arylene group, alkylene arylene group, alkylene arylene alkylene, alkenylene arylene group, alkenylene arylene alkenylene, alkylene arylene alkenylene, alkynylene arylene group, alkynylene arylene alkynylene, heteroarylene group, alkylene heteroarylene group, alkylene heteroarylene alkylene, alkenylene heteroarylene group, alkenylene heteroarylene alkenylene, alkylene heteroarylene alkenylene, alkynylene heteroarylene group, alkynylene heteroarylene alkynylene, 1,4-alkyl substituted piperazine, carbonyl group and thiocarbonyl group; $R_3$ and $R_4$ may be the same, or different from each other.

In the curing agent of the present invention, one end of $R_3$ (or $R_4$) is connected to the oxygen atom, and the other end is connected to the terminal group of the molecule, wherein the terminal group is selected from the reactive groups which are sure to react with epoxy resin by those skilled in the art (e.g. groups having active hydrogen, such as "—$NH_2$" or "—NH" or "—SH"), In the present invention,

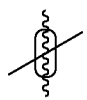

represents the terminal group of the molecular chain of the curing agent.

The illustrative degradable curing agent has the following molecular structure:

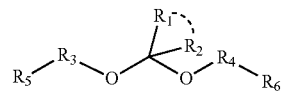

wherein $R_1$ and $R_2$ are independently anyone selected from the group consisting of hydrogen atom, alkyl group, cycloalkyl group, heterocyclic group, heterocycloalkyl group, alkenyl group, cycloalkenyl group, aromatic group, heteroaromatic group, alkyl heteroalkyl group, alkynyl group, alkylene group, alkylene heteroalkylene, alkenylene group, alkylene heteroalkenylene, alkynylene group and alkylene heteroalkynylene; $R_1$ and $R_2$ may be the same, or different from each other; $R_1$ and $R_2$ may be in the same ring structure together with the co-adjacent carbon atoms;

$R_3$ and $R_4$ are independently anyone selected from the group consisting of arylene group, alkylene arylene group, alkenylene arylene group, alkynylene arylene group, heteroarylene group, alkylene heteroarylene group, alkenylene heteroarylene group and alkynylene heteroarylene group; $R_3$ and $R_4$ may be the same, or different from each other;

$R_5$ is

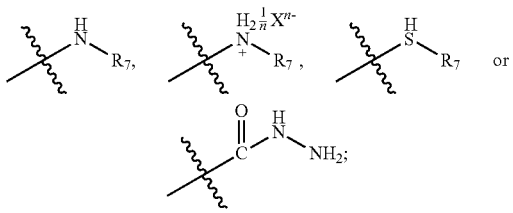

$R_6$ is

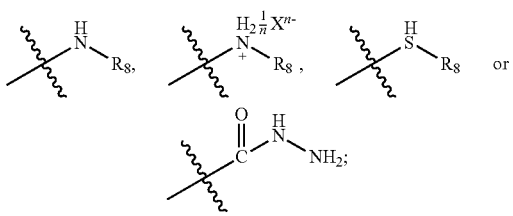

$R_5$ and $R_6$ may be the same, or different from each other;

$R_7$ and $R_8$ are independently anyone selected form the group consisting of hydrogen atom, alkyl group, cycloalkyl group, heterocylic group, heterocycloalkyl group, alkenyl group, cycloalkenyl group, aromatic group, heteroaromatic group, alkoxyalkyl and alkynyl group;

$R_7$ and $R_8$ may be the same, or different from each other;

$X^{n-}$ is one selected from the group consisting of $C_1$-$C_{10}$ aliphatic carboxylate anion, $C_1$-$C_{10}$ alicyclic carboxylate anion, aromatic carboxylate anion and heterocyclic aromatic carboxylate anion; n is 1, 2 or 3; preferably, said $X^{n-}$ is one selected from the group consisting of lactate anion, oxalate anion, citrate anion, malate anion, tartrate anion, adipate anion, suberate anion, benzoate anion, phthalate anion, malonate anion, succinate anion, glutarate anion, pimelate anion, acetate anion, isophthalate anion and salicylate anion.

The illustrative end groups connecting to $R_3$ (or $R_4$) are selected from the group consisting of —$NH_2$, —NH and —SH.

The illustrative curing agent is

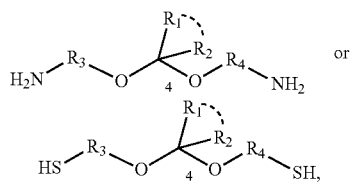

preferably

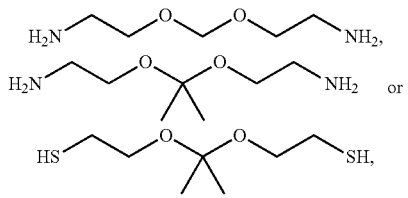

wherein $R_1$, $R_2$, $R_3$ and $R_4$ are defined as above.

The epoxy resin is in an amount of 15-30%, e.g. 16%, 17%, 18%, 19%, 20%, 21%, 22%, 23%, 24%, 25%, 26%, 27%, 28% or 29%.

The curing agent is in an amount of 1-10%, e.g. 1.5%, 2%, 2.5%, 3%, 3.5%, 4%, 4.5%, 5%, 5.5%, 6%, 6.5%, 7%, 7.5%, 8%, 8.5%, 9% or 9.5%.

The reactive diluent is in an amount of 0.1-2%, e.g. 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8% or 1.9%.

The conductive filler is in an amount of 15-85%, e.g. 20%, 25%, 30%, 35%, 40%, 45%, 50%, 55%, 60%, 65%, 70%, 75% or 85%.

$R_1$ and $R_2$ may be in the same ring structure together with the co-adjacent carbon atoms.

According to the present invention, the epoxy resin is anyone selected from the group consisting of glycidyl ether type epoxy resin, glycidyl ester type epoxy resin, glycidyl ammonia type epoxy resin, aliphatic epoxy resin, alicyclic epoxy resin and nitrogen-containing epoxy resin, or a mixture of at least two selected therefrom.

Preferably, the reactive diluent is anyone selected from the group consisting of allyl glycidyl ether, butyl glycidyl ether, 1,4-butanediol diglycidyl ether, 1,6-hexanediol diglycidyl ether, neopentyl glycol glycidyl ether, trimethylolpropane glycidyl ether and polyethylene glycol diglycidyl ether, or a mixture of at least two selected therefrom.

Preferably, the conductive filler is anyone selected from the group consisting of flaky metallic silver, micron silver powder, flaky gold, micron gold, flaky metallic copper, micron copper powder, flaky metallic nickel and micron nickel powder, or a mixture of at least two selected therefrom.

In the present invention, the conductive filler may be, or may not be surface-modified by graphene. When the conductive filler is surface-modified by graphene, the amount of graphene is in an amount of 0.2-2% by weight of the conductive filler, e.g. 0.4%, 0.6%, 0.8%, 1%, 1.2%, 1.4%, 1.6% or 1.8%.

Preferably, a coupling agent is added while the conductive filler is surface modified by graphene, wherein the coupling agent is anyone selected from the group consisting of γ-aminopropyltriethoxysilane, γ-aminopropyltrimethoxysilane, γ-(2,3-epoxypropoxy)propyltrimethoxysilane, γ-(methacryloyloxy)propyltrimethoxysilane, γ-aminopropylmethyldimethoxysilane, γ-aminopropylmethyldiethoxysilane and vinyltriethoxysilane, or a mixture of at least two selected therefrom.

Preferably, the coupling agent is in an amount of from 0.5% to 1% by weight of the conductive filler, e.g. 0.55%, 0.6%, 0.65%, 0.7%, 0.75%, 0.8%, 0.85%, 0.9% or 0.95%.

Said expression "comprising/comprise(s)" of the present invention means that, in addition to the components, other components may be included, and impart different properties to the epoxy conductive adhesive. In addition, said "comprising/comprise(s)" described in the present invention may also be replaced by "is/are" or "consisting/consist(s) of" in a closed manner. Regardless of the components of the epoxy conductive adhesive of the present invention, the sum of the weight percentage of the raw materials of the epoxy conductive adhesive is 100% (excluding graphene and coupling agent).

For example, the epoxy conductive adhesive further comprises a reinforcing material, which is anyone selected from the group consisting of carbon nanotubes, boron nitride nanotubes, carbon black, metal nanoparticles, metal oxide nanoparticles, organic nanoparticles, iron oxide, glass fiber, carbon fiber, natural fiber, chemical fiber, and any fabric made of fibrous materials, or a mixture of at least two selected therefrom.

For example, the epoxy conductive adhesive further comprises an adjuvant, which is anyone selected from the group consisting of an accelerator, a plasticizer, a toughening agent, a thickening agent, a defoamer, a leveling agent, an ultraviolet absorber, an antioxidant, a brightener, a fluorescent reagent and a pigment, or a mixture of at least two selected therefrom.

The second object of the present invention lies in providing a process for preparing the degradable and recoverable epoxy conductive adhesive as described above, which comprises the following steps:

Dissolving the reactive diluent, the curing agent and the epoxy resin in an organic solvent, stirring at a temperature of 20-50° C. (for example, 24, 28, 32, 36, 40, 44 or 48° C.) for 5-30 minutes (e.g. 8, 11, 14, 17, 20, 23, 26 or 29 min), adding optional graphene solution and continuing to stir for 10-30 min (13, 16, 19, 22, 25 or 28 min), adding the conductive filler, dispersing for 30-120 min (e.g. 40, 50, 60, 70, 80, 90, 100 or 110 min) to obtain a degradable and recoverable epoxy conductive adhesive which is stored at a low temperature of 0-10° C.

Said dispersion refers to ultrasonic dispersion or stirring dispersion, wherein said ultrasonic dispersion is carried out at a temperature of 20-60° C.; and said stirring dispersion is carried out in a three-roll or double-planetary hybrid mixer.

Preferably, the graphene solution is prepared by oxidizing natural flake graphite by Hummers method to obtain graphite oxide, dissolving the coupling agent in an organic solvent, and then mixing the graphene with the organic solvent in a mass ratio of 2-10:50-200, stirring the mixed solution in a magnetic stirrer and heating for 0.5-2 h (e.g. 0.6, 0.8, 1.0, 1.2, 1.4, 1.6 or 1.8 h) to control the temperature to be 20-50° C. (e.g. 24° C., 28° C., 32° C., 36° C., 40° C., 44° C. or 48° C.), ultrasonic processing the mixed solution after magnetic stirring for 1-3 h (e.g. 1.3, 1.6, 1.9, 2.2, 2.5 or 2.8 h), standing still at room temperature for 1-12 h, centrifuging the upper suspension of the mixed solution, distilling to obtain a graphene solution. Due to the high price of graphene, recycling is necessary.

The organic solvent is preferably anyone selected from the group consisting of acetone, butanone, N,N-dimethylformamide, tetrahydrofuran, dimethylsulfoxide and N-methylpyrrolidone, or a mixture of at least two selected therefrom.

It is the third object of the present invention to provide a process for degrading and recovering the degradable and recoverable epoxy conductive adhesive as described above, wherein said process further comprises the step of neutralizing the solution obtained after degradation and adjusting the pH of the solution by using alkali solution, after degrading the epoxy conductive adhesive by using acids and solvents under heating conditions.

Preferably, the process further comprises the step of recovering the degraded polymer after the degradation step and neutralization steps.

Preferably, the acid is anyone selected from the group consisting of hydrochloric acid, hydrobromic acid, hydrofluoric acid, acetic acid, trifluoroacetic acid, lactic acid, formic acid, propionic acid, citric acid, methanesulfonic acid, p-toluenesulfonic acid, nitric acid, sulfuric acid, sulfurous acid, phosphoric acid, perchloric acid, benzoic acid, salicylic acid and phthalic acid, or a mixture of at least two selected therefrom.

Preferably, the solvent is anyone selected from the group consisting of methanol, ethanol, ethylene glycol, propanol, isopropanol, butanol, isobutanol, t-butanol, pentanol, hexanol, heptanol, octanol, nonanol, benzyl alcohol, phenethyl alcohol, P-dihydroxymethylbenzene, m-dihydroxymethylbenzene, o-dihydroxymethyl-benzene, p-dihydroxyethylbenzene, m-dihydroxyethylbenzene, o-dihydroxyethyl-benzene, water, N,N-dimethylformamide, N,N-dimethylacetamide, N-methylpyrrolidone, dimethylsulfoxide, tetrahydrofuran, methyltetrahydrofuran, glycerol and dioxane, or a mixture of at least two selected therefrom.

Preferably, the acid has a mass concentration of 0.1-100% in the solvent.

Preferably, the heating temperature ranges from 15° C. to 400° C., e.g. 20° C., 40° C., 70° C., 100° C., 130° C., 170° C., 210° C., 250° C., 290° C., 310° C., 330° C., 350° C., 370° C. or 390° C.

Preferably, the heating lasts for 1-120 h, e.g. 2, 5, 10, 20, 30, 40, 50, 60, 70, 80, 90, 100 or 110 h.

Preferably, the alkali is anyone selected from the group consisting of lithium hydroxide, sodium hydroxide, potassium hydroxide, calcium hydroxide, sodium carbonate, sodium bicarbonate, potassium carbonate, potassium bicarbonate and ammonia, or a mixture of at least two selected therefrom.

Preferably, the solvent of the alkali solution is anyone selected from the group consisting of methanol, ethanol, ethylene glycol, propanol, isopropanol, butanol, isobutanol, t-butanol, pentanol, hexanol, heptanol, octanol, nonanol, water, N,N-dimethylformamide, N,N-dimethylacetamide, N-methylpyrrolidone, dimethylsulfoxide, tetrahydrofuran, methyltetrahydrofuran, glycerol and dioxane, or a mixture of at least two selected therefrom.

Preferably, the alkali solution has a mass concentration of 0.1-100%.

Preferably, the temperature is maintained at 0-200° C. (e.g. 10° C., 30° C., 50° C., 70° C., 90° C., 110° C., 130° C., 150° C., 170° C. or 190° C.) while the pH of the solution is adjusted to greater than 6.

As compared to the prior art, the present invention has the following beneficial effect.

The present invention discards traditional epoxy resin conductive adhesive curing agents, such as dicyandiamide, aromatic amines and the like. By applying the recoverable and degradable epoxy resin curing agent having a specific molecular structure, the degradation can be conducted at normal pressure, mild and specific conditions after the epoxy resin in the conductive adhesive is cured. Such process is simple, easy to operate, process-feasible, and of environmental protection, greatly reduces the recycling cost, overcomes the shortcoming of being difficult to recover in the prior art, so as to have huge economic and environmental advantages for the recovery of the conductive adhesive. Moreover, the application of the recoverable and degradable epoxy resin curing agent having a specific molecular structure also greatly improves the shear strength of the conductive adhesive, which may reach 27 MPa or more, so as to substantially increase the reliability and lifetime of the conductive adhesive.

EMBODIMENTS

The technical solutions of the present invention are further explained by the following specific embodiments.

EXAMPLE 1

(1) First dissolving 1.5 g of a vinyltriethoxysilane coupling agent in 20 g of a butanone solvent, then adding 2 g of graphene while adding 40 g of a butanone solvent, and mixing with graphene, placing the mixed solution in a magnetic stirrer, stirring and heating for 1 hour, controlling the heating temperature at 30° C., subjecting the mixed solution to ultrasonic processing for 1 hour after the magnetic stirring, standing still for 12 hours, centrifuging the upper suspension of the mixed solution, distilling to obtain a graphene solution.

(2) Dissolving 1 g of an allyl glycidyl ether diluent, 5 g of a curing agent A and 15.6 g of a bisphenol F830 epoxy resin in a butanone solvent, stirring at 30° C. for 15 minutes, adding 3 g of a graphene solution, continuing to stir for 20 minutes, adding 80 g of flaky silver (2 μm), subjecting to ultrasonic dispersion at 30° C. for 60 minutes to obtain a conductive adhesive.

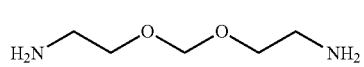

A

EXAMPLE 2

(1) First dissolving 1.5 g of a vinyltriethoxysilane coupling agent in 20 g of a butanone solvent, then adding 2 g of graphene while adding 40 g of a butanone solvent, and mixing with graphene, placing the mixed solution in a magnetic stirrer, stirring and heating for 1 hour, controlling the heating temperature at 30° C., subjecting the mixed solution to ultrasonic processing for 1 hour after the magnetic stirring, standing still for 12 hours, centrifuging the upper suspension of the mixed solution, distilling to obtain a graphene solution.

(2) Dissolving 1 g of a butyl glycidyl ether diluent, 5 g of a curing agent B and 16 g of a bisphenol A828 epoxy resin in a butanone solvent, stirring at 30° C. for 15 minutes, adding 3 g of a graphene solution, continuing to stir for 20 minutes, adding 80 g of flaky silver (2 μm), subjecting to ultrasonic dispersion at 30° C. for 60 minutes to obtain a conductive adhesive.

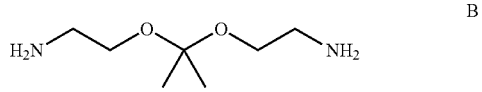

B

EXAMPLE 3

(1) First dissolving 1.5 g of a vinyltriethoxysilane coupling agent in 20 g of a butanone solvent, then adding 2 g of graphene while adding 40 g of a butanone solvent, and mixing with graphene, placing the mixed solution in a magnetic stirrer, stirring and heating for 1 hour, controlling the heating temperature at 50° C., subjecting the mixed solution to ultrasonic processing for 3 hours after the magnetic stirring, standing still for 1 hours, centrifuging the upper suspension of the mixed solution, distilling to obtain a graphene solution.

(2) Dissolving 1 g of a butyl glycidyl ether diluent, 5 g of a curing agent C and 16 g of a bisphenol A828 epoxy resin in a butanone solvent, stirring at 50° C. for 10 minutes, adding 3 g of a graphene solution, continuing to stir for 30 minutes, adding 80 g of flaky silver (2 μm), subjecting to ultrasonic dispersion at 30° C. for 120 minutes to obtain a conductive adhesive.

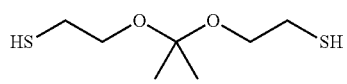

C

COMPARISON EXAMPLE 1

(1) First dissolving 1.8 g of a γ-aminopropyltrimethoxysilane coupling agent in 20 g of a butanone solvent, then adding 2 g of graphene while adding 40 g of a butanone solvent, and mixing with graphene, placing the mixed solution in a magnetic stirrer, stirring and heating for 1 hour, controlling the heating temperature at 30° C., subjecting the mixed solution to ultrasonic processing for 1 hour after the magnetic stirring, standing still for 12 hours, centrifuging the upper suspension of the mixed solution, distilling to obtain a graphene solution.

(2) Dissolving 1 g of an allyl glycidyl ether diluent, 1 g of a curing agent of dicyandiamide and 15.6 g of a bisphenol F830 epoxy resin in a butanone solvent, stirring at 30° C. for 15 minutes, adding 3 g of a graphene solution, continuing to stir for 20 minutes, adding 80 g of flaky silver (2 μm), subjecting to ultrasonic dispersion at 30° C. for 60 minutes to obtain a conductive adhesive.

COMPARISON EXAMPLE 2

(1) First dissolving 1.5 g of a vinyltriethoxysilane coupling agent in 20 g of a butanone solvent, then adding 2 g of graphene while adding 40 g of a butanone solvent, and mixing with graphene, placing the mixed solution in a magnetic stirrer, stirring and heating for 1 hour, controlling the heating temperature at 30° C., subjecting the mixed solution to ultrasonic processing for 1 hour after the magnetic stirring, standing still for 12 hours, centrifuging the upper suspension of the mixed solution, distilling to obtain a graphene solution.

(2) Dissolving 1 g of an allyl glycidyl ether diluent, 1 g of a curing agent of dicyandiamide and 16.5 g of a bisphenol A828 epoxy resin in a butanone solvent, stirring at 30° C. for 15 minutes, adding 3 g of a graphene solution, continuing to stir for 20 minutes, adding 80 g of flaky silver (2 μm), subjecting to ultrasonic dispersion at 30° C. for 60 minutes to obtain a conductive adhesive.

COMPARISON EXAMPLE 3

(1) First dissolving 1.8 g of a γ-aminopropyltrimethoxysilane coupling agent in 20 g of a butanone solvent, then adding 2 g of graphene while adding 40 g of a butanone solvent, and mixing with graphene, placing the mixed solution in a magnetic stirrer, stirring and heating for 1 hour, controlling the heating temperature at 30° C., subjecting the mixed solution to ultrasonic processing for 1 hour after the magnetic stirring, standing still for 12 hours, centrifuging the upper suspension of the mixed solution, distilling to obtain a graphene solution.

(2) Dissolving 1 g of a butyl glycidyl ether diluent, 5 g of a curing agent of diaminodiphenyl-methane (DDM) and 15.6 g of a bisphenol F830 epoxy resin in a butanone solvent, stirring at 30° C. for 15 minutes, adding 3 g of a graphene solution, continuing to stir for 20 minutes, adding 80 g of flaky silver (2 μm), subjecting to ultrasonic dispersion at 30° C. for 60 minutes to obtain a conductive adhesive.

As for the epoxy conductive adhesives prepared above, the conductivities and shear strengthes thereof were tested. The testing results are shown in Table 1 below.

TABLE 1

| | | | | | | | |
|---|---|---|---|---|---|---|---|
| \multicolumn{8}{c}{Performance testing results of epoxy conductive adhesives} |
| Test items | Testing conditions | Example 1 | Example 2 | Example 3 | Comparison Example 1 | Comparison Example 2 | Comparison Example 3 |
| Volume resistivity (mΩ · cm) | GB/T1410-2006 | 37.5 | 35.4 | 35.7 | 39.3 | 40.2 | 36.2 |
| Shear strength (MPa) | GB/T7124-1986 | 28 | 27 | 26.8 | 25.7 | 24.6 | 21.3 |

It can be seen according to the testing results above that the epoxy conductive adhesives using the curing agent comprising breakable molecular structure of the present invention has excellent conductive property, and maintains better shear strength.

The methods for the aforesaid performance tests are as follows.

Volume resistivity: tested according to the testing standard: GB/T1410-2006 by using RT-1000 Resistivity tester from Xiangtan Huafeng Instrument Manufacturing Co., Ltd.

Shear strength: tested according to the testing standard: GB/T 7124-1986 by using CMT4204 from Meters Industrial Systems (China) Limited.

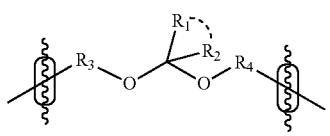

Certainly, the above-described examples are merely preferred examples of the present invention and are not intended to limit the implementation scope of the present invention. Therefore any equivalent change or modification made according to the construction, features and principles within the patent scope of the present invention is included within the patent scope of the present invention.

The applicant claims that the present invention describes the detailed process of the present invention, but the present invention is not limited to the detailed process of the present invention. That is to say, it does not means that the present invention shall be carried out with respect to the above-described detailed process of the present invention. Those skilled in the art shall know that any improvements to the present invention, equivalent replacements of the raw materials of the present invention, additions of auxiliary, selections of any specific ways all fall within the protection scope and disclosure scope of the present invention.

The invention claimed is:

1. A degradable and recoverable epoxy conductive adhesive comprising the following raw materials in an organic solvent: 15-30% by weight of an epoxy resin, 1-10% by weight of a curing agent, 0.1-2% by weight of a reactive diluent and at least 15% by weight of a conductive filler, each based on the total weight of the raw materials; wherein the conductive filler is surface-modified by graphene, and the graphene is present in an amount of 0.2-2% by weight of the conductive filler; and wherein the curing agent comprises a breakable molecular structure shown as follows:

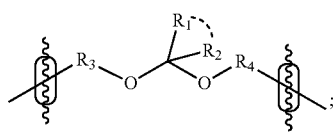

wherein $R_1$ and $R_2$ are independently selected from the group consisting of hydrogen atom, alkyl group, cycloalkyl group, heterocyclic group, heterocycloalkyl group, alkenyl group, cycloalkenyl group, aromatic group, heteroaromatic group, alkyl heteroalkyl group, alkynyl group, alkylene group, alkylene heteroalkylene, alkenylene group, alkylene heteroalkenylene, alkynylene group and alkylene heteroalkynylene; and $R_3$ and $R_4$ are each independently selected from the group consisting of alkylene group, alkylene heteroalkylene, alkenylene group, alkenylene heteroalkenylene, alkylene heteroalkenylene, alkynylene group, cycloalkylene group, alkylene cycloalkylene, alkylene cycloalkylene alkylene, alkenylene cycloalkylene, alkenylene cycloalkylene alkenylene, alkylene cycloalkylene alkenylene, alkynylene cycloalkylene, alkynylene cycloalkylene alkynylene, heterocycloalkylene group, alkylene heterocycloalkylene, alkylene heterocycloalkyl alkylene, alkenylene heterocycloalkylene, alkenylene heterocycloalkyl alkenylene, alkylene heterocycloalkyl alkenylene, alkynylene heterocycloalkylene, alkynylene heterocycloalkyl alkynylene, cycloalkenylene, alkylene cycloalkenylene, alkylene cycloalkenylene alkylene, alkenylene cycloalkenylene, alkenylene cycloalkenylene alkenylene, alkylene cycloalkenylene alkenylene, alkynylene cycloalkenylene, alkynylene cycloalkenylene alkynylene, heterocycloalkenylene, alkylene heterocycloalkenylene, alkylene heterocycloalkenyl alkylene, alkenylene heterocycloalkenylene, alkenylene heterocycloalkenyl alkenylene, alkylene heterocycloalkenyl alkenylene, alkynylene heterocycloalkenylene, alkynylene heterocycloalkenyl alkynylene, arylene group, alkylene arylene group, alkylene arylene alkylene, alkenylene arylene group, alkenylene arylene alkenylene, alkylene arylene alkenylene, alkynylene arylene group, alkynylene arylene alkynylene, heteroarylene group, alkylene heteroarylene group, alkylene heteroarylene alkylene, alkenylene heteroarylene group, alkenylene heteroarylene alkenylene, alkylene heteroarylene alkenylene, alkynylene heteroarylene group, alkynylene heteroarylene alkynylene, 1,4-alkyl substituted piperazine, carbonyl group and thiocarbonyl group.

2. The degradable and recoverable epoxy conductive adhesive according to claim 1, wherein $R_1$ and $R_2$ are in the same ring structure together with the co-adjacent carbon atoms.

3. The degradable and recoverable epoxy conductive adhesive according to claim 1, wherein the epoxy resin is selected from the group consisting of glycidyl ether type epoxy resin, glycidyl ester type epoxy resin, glycidyl ammonia type epoxy resin, aliphatic epoxy resin, alicyclic epoxy resin, nitrogen-containing epoxy resin, and mixtures thereof.

4. The degradable and recoverable epoxy conductive adhesive according to claim 1, wherein the reactive diluent is selected from the group consisting of allyl glycidyl ether, butyl glycidyl ether, 1,4-butanediol diglycidyl ether, 1,6-hexanediol diglycidyl ether, neopentyl glycol glycidyl ether, trimethylolpropane glycidyl ether, polyethylene glycol diglycidyl ether, and mixtures thereof.

5. The degradable and recoverable epoxy conductive adhesive according to claim 1, wherein the conductive filler is selected from the group consisting of flaky metallic silver, micron silver powder, flaky gold, micron gold, flaky metallic copper, micron copper powder, flaky metallic nickel, micron nickel powder, and mixtures thereof.

6. The degradable and recoverable epoxy conductive adhesive according to claim 1, wherein the graphene is coupled to the surface of the conductive filler with a coupling agent, wherein the coupling agent is selected from the group consisting of γ-aminopropyltriethoxysilane, γ-aminopropyltrimethoxysilane, γ-(2,3-epoxypropoxy)propyltrimethoxysilane, γ-(methacryloyloxy)propyltrimethoxysilane, γ-aminopropylmethyldimethoxysilane, γ-aminopropylmethyldiethoxysilane, vinyltriethoxysilane, and mixtures thereof.

7. The degradable and recoverable epoxy conductive adhesive according to claim 6, wherein the coupling agent is present in an amount of from 0.5% to 1% by weight of the conductive filler.

8. A cured product of the degradable and recoverable epoxy conductive adhesive according to claim 1.

9. A process for degrading the cured product according to claim 8, comprising: degrading the cured product using acids and solvents under heating conditions to produce a solution of degraded polymer; neutralizing the solution of degraded polymer; and adjusting the pH of the solution of degraded polymer with an alkali solution.

10. The process according to claim 9, further comprising recovering the degraded polymer.

11. The process according to claim 9, wherein the acid is selected from the group consisting of hydrochloric acid, hydrobromic acid, hydrofluoric acid, acetic acid, trifluoroacetic acid, lactic acid, formic acid, propionic acid, citric acid, methanesulfonic acid, p-toluenesulfonic acid, nitric acid, sulfuric acid, sulfurous acid, phosphoric acid, perchloric acid, benzoic acid, salicylic acid, phthalic acid, and mixtures thereof.

12. The process according to claim 9, wherein the alkali is selected from the group consisting of lithium hydroxide, sodium hydroxide, potassium hydroxide, calcium hydroxide, sodium carbonate, sodium bicarbonate, potassium carbonate, potassium bicarbonate, ammonia, and mixtures thereof.

13. The process according to claim 9, wherein the solvent is selected from the group consisting of methanol, ethanol, ethylene glycol, propanol, isopropanol, butanol, isobutanol, t-butanol, pentanol, hexanol, heptanol, octanol, nonanol, benzyl alcohol, phenethyl alcohol, p-dimethylol benzene, m-dimethylol benzene, o-dimethylol benzene, p-dihydroxyethyl benzene, m-dihydroxyethyl benzene, o-dihydroxyethylbenzene, water, N,N-dimethyl-formamide, N,N-dimethylacetamide, N-methylpyrrolidone, dimethylsulfoxide, tetrahydrofuran, methyltetrahydrofuran, glycerol, dioxane, and mixtures thereof.

14. The process according to claim 9, wherein the acid has a mass concentration of 0.1-100% in the solvent;
optionally, the heating conditions range from 15° C. to 400° C.; and
optionally, the heating conditions last for 1-120 h.

15. The process according to claim 9, wherein the alkali solution comprises a solvent selected from the group consisting of methanol, ethanol, ethylene glycol, propanol, isopropanol, butanol, isobutanol, t-butanol, pentanol, hexanol, heptanol, octanol, nonanol, water, N,N-dimethyl-formamide, N,N-dimethylacetamide, N-methylpyrrolidone, dimethylsulfoxide, tetrahydrofuran, methyltetrahydrofuran, glycerol, dioxane, and mixtures thereof.

16. The process according to claim 9, wherein the alkali solution has a mass concentration of 0.1-100%; and
optionally, said adjusting the pH of the solution of degraded polymer is performed at a temperature of 0-200° C. to achieve a pH greater than 6.

17. A process for preparing the degradable and recoverable epoxy conductive adhesive according to claim 1, comprising: dissolving the reactive diluent, curing agent and epoxy resin in the organic solvent; stirring at 20-50° C. for 5-30 min; adding a graphene solution comprising graphene and an organic solvent; continuing to stir for 10-30 min; then adding the conductive filler; and dispersing for 30-120 min to obtain the degradable and recoverable epoxy conductive adhesive.

18. The process according to claim 17, wherein said dispersing is performed with ultrasonic dispersion at 20-60° C., stirring dispersion conducted in a three-roll or stirring dispersion conducted in a double-planetary hybrid mixer.

19. The process according to claim 17, wherein the graphene solution is prepared by: oxidizing natural flake graphite by Hummers method to obtain graphite oxide; dissolving a coupling agent in the organic solvent; then mixing the graphite oxide with the organic solvent and the dissolved coupling agent in a mass ratio of 2-10:50-200 to obtain a mixed solution; stirring the mixed solution in a magnetic stirrer and heating for 0.5-2 hours to control the temperature to be 20-50° C.; subjecting the mixed solution to ultrasonic processing for 1-3 h after magnetic stirring; allowing the mixed solution to stand still for 1-12 h; centrifugalizing an upper suspension of the mixed solution; and distilling to obtain the graphene solution.

20. The process according to claim 19, wherein the organic solvent in the graphene solution is selected from the group consisting of acetone, butanone, N,N-dimethylformamide, tetrahydrofuran, dimethylsulfoxide, N-methylpyrrolidone, and mixtures thereof.

* * * * *